(12) United States Patent
Wang

(10) Patent No.: US 7,199,792 B2
(45) Date of Patent: Apr. 3, 2007

(54) TRAY MOUNTED CURSOR CONTROL INPUT DEVICE FOR INTEGRATION WITH COMPUTER KEYBOARD

(75) Inventor: Steven Wang, Andover, MA (US)

(73) Assignee: Contour Design, Inc., Windham, NH (US)

( * ) Notice: Subject to any disclaimer, the term of this patent is extended or adjusted under 35 U.S.C. 154(b) by 57 days.

(21) Appl. No.: 09/989,714

(22) Filed: Nov. 20, 2001

(65) Prior Publication Data
US 2002/0126025 A1    Sep. 12, 2002

Related U.S. Application Data

(60) Provisional application No. 60/252,451, filed on Nov. 21, 2000.

(51) Int. Cl.
*G09G 5/00*    (2006.01)
(52) U.S. Cl. ........................ 345/184; 345/156
(58) Field of Classification Search ......... 345/156–184
See application file for complete search history.

(56) References Cited

U.S. PATENT DOCUMENTS

| | | | | |
|---|---|---|---|---|
| 4,543,571 A | | 9/1985 | Bilbrey et al. | 340/710 |
| 4,544,915 A | | 10/1985 | Wieme et al. | 340/347 P |
| 4,692,756 A | | 9/1987 | Clark | 340/709 |
| 4,712,101 A | * | 12/1987 | Culver | 345/157 |
| 4,724,715 A | | 2/1988 | Culver | 74/471 R |
| 4,799,049 A | | 1/1989 | Avila | 340/709 |
| 4,928,093 A | | 5/1990 | Rahman | 340/709 |
| 4,982,618 A | * | 1/1991 | Culver | 345/184 |
| 5,115,231 A | | 5/1992 | Avila et al. | 340/709 |
| 5,126,723 A | | 6/1992 | Long et al. | 340/710 |
| 5,164,712 A | * | 11/1992 | Niitsuma | 345/184 |
| 5,635,926 A | * | 6/1997 | Li | 345/163 |
| 5,666,138 A | | 9/1997 | Culver | 345/161 |

(Continued)

FOREIGN PATENT DOCUMENTS

| | | |
|---|---|---|
| EP | 0 382 350 A2 | 8/1990 |
| EP | 0 992 936 A2 | 4/2000 |

OTHER PUBLICATIONS

CELLTRIX, TrackBar Pro product information, Internet site http://www.celltrix.com.tw/products, as of Nov. 20, 2000.

(Continued)

*Primary Examiner*—Alexander Eisen
(74) *Attorney, Agent, or Firm*—Weingarten, Schurgin, Gagnebin & Lebovici LLP

(57) ABSTRACT

A pointing device for use with a keyboard functions like a computer mouse. It incorporates a plurality of configurable function keys. The pointing device is composed of a rolling surface capable of rotation and translation that may activate a switch when it is depressed. An optical sensor monitors the rotation and translation of the rolling surface and translates that motion into communications interpretable by a mouse software driver. An edge sensor allows repositioning of the rolling surface without cursor movement when limits of travel are reached. The pointing device communicates with the computer through a serial communication facility such as a PS/2 or USB connection. The enclosure containing the rolling surface incorporates an aperture allowing a portion of the rolling surface to be available for manipulation, an elevated support surface for the keyboard and provision for palm rests.

78 Claims, 11 Drawing Sheets

U.S. PATENT DOCUMENTS

| | | | | |
|---|---|---|---|---|
| 5,703,356 A | * | 12/1997 | Bidiville et al. | 250/221 |
| 5,818,427 A | | 10/1998 | Stromberg | 345/163 |
| 6,018,334 A | * | 1/2000 | Eckerberg et al. | 345/167 |
| 6,020,877 A | | 2/2000 | Smith | 345/157 |
| 6,040,977 A | | 3/2000 | Hoffer | 361/680 |
| 6,046,728 A | | 4/2000 | Hume et al. | 345/157 |
| 6,084,574 A | | 7/2000 | Bidiville | 345/166 |
| 6,091,401 A | | 7/2000 | Chen et al. | 345/156 |
| 6,300,938 B1 | * | 10/2001 | Culver | 345/184 |
| 6,337,680 B1 | * | 1/2002 | Hamaji | 345/184 |

OTHER PUBLICATIONS

Technical Data Sheet for part #HDNS-2000, Agilent Technologies, 5980-1088E (May 2000).

Technical Data Sheet for part #HDNS-2100 and HDNS-2100 #001, Agilent Technologies, 5968-7175E (Jan. 2000).

Technical Data Sheet for part #HDNS-2200 and HDNS-2200 #001, Agilent Technologies, 5968-7178E (Jan. 2000).

SUN-FLEX, Ergonomisk funktion, Internet product literature at http://www.nomus.nu, Aug. 20, 2001, 6 pages.

* cited by examiner

TRAY MOUNTED CURSOR CONTROL INPUT DEVICE FOR INTEGRATION WITH COMPUTER KEYBOARD

CROSS REFERENCE TO RELATED APPLICATIONS

This application claims the benefit under 35 U.S.C. §119 (e) of U.S. Provisional Application No. 60/252,451, filed Nov. 21, 2000, the entire disclosure of which is incorporated herein by reference.

STATEMENT REGARDING FEDERALLY SPONSORED RESEARCH OR DEVELOPMENT

N/A

BACKGROUND OF THE INVENTION

The computer mouse has been the primary vehicle for users to control the movement of a cursor on a screen. One reason for this is that the action of the mouse uses very natural processes in the brain. The "point and click" sequence of moving the cursor to the desired position and depressing a button to select an action uniquely utilizes the existing brain pathways established over many years. Although the mouse has the physiological advantage among positioning devices because of its accurate feel and ease of use, it has disadvantages—principally in the amount of desk space required and in the fact that the hands must be removed from the keyboard to use the mouse. In addition, injuries have been recorded based on reaching an awkward distance to access the mouse or positioning the mouse at an incorrect height for ergonomic operation. It would be advantageous to eliminate the disadvantages associated with using a computer mouse.

Alternate positioning devices that have been developed to replace the mouse include the trackball, the touchpad, the joystick, the touch sensitive screen and devices tailored for particular applications. The touch sensitive screen and joystick do not address the issue of keeping the hands engaged with the keyboard. The trackball, touchpad and other special devices have typically been integrated into a special keyboard in order to keeping the hands in typing position. Nonetheless, users have not adopted these devices as readily as they have the mouse.

Rollerbar devices have been developed that relied on separate sensors to sense rotational and translational movement of a bar. These have not met with great success. One device retained the mouse and its interface to the computer but adapted it to a rollerbar configuration. This device captured the mouse in a pad that placed a rollerbar under the mouse's ball. As the rollerbar moved, it moved the mouse ball so that the mouse sent the appropriate signals to the computer. The rollerbar could be positioned directly abutting the keyboard space bar. In addition to the rollerbar under the mouse ball, the device incorporated a pair of movable pads that were connected to the mouse buttons. By depressing the pads, the mouse buttons were depressed. While this device worked, it did not accommodate all computer mouses and did not have the intuitive feel of the mouse.

A positioning device that is controllable while the hands remain on the keyboard in order to increase productivity is needed. In addition, the positioning device should minimize strain on wrist and shoulder while providing fast and precise positioning functions as an add-on to existing keyboards.

BRIEF SUMMARY OF THE INVENTION

An ergonomic positioning device provides an interactive positioning device, useable with a standard keyboard, that minimizes strain on wrist and shoulders while providing fast, intuitive and precise positioning functions. The ergonomic positioning device incorporates a movable surface, such as a rollerbar, and function buttons positioned so they are reachable while a user is typing on the keyboard. The full range of functions normally available on a mouse is provided by the ergonomic positioning device.

The cursor positioning function is accomplished in one embodiment by a rollerbar that rotates for vertical screen positioning and translates for horizontal screen positioning. Once the cursor has been positioned, action is initiated by depressing "clicking" the rollerbar or one of the function buttons. Function button action and click tension of the rollerbar are configurable for user preference.

The ergonomic positioning device is a highly accurate positioning device that requires minimum maintenance. A single optical sensor monitors the rollerbar or other movable surface, detecting changes in position that are transmitted to the computer. The optical sensor focuses on the curved surface of the rollerbar and is mounted at an internal position that assures the rollerbar and sensor are always positioned correctly. Further, the sensor location is selected so that when the rollerbar is clicked, the extent of rollerbar vertical displacement is limited.

The ergonomic positioning device incorporates a tray that allows operation of the ergonomic positioning device and keyboard in non-traditional attitudes, such as positioned on the lap, as well as standard orientations. This tray further assures that the keyboard is elevated sufficiently above the rollerbar for ergonomic comfort and the tray provides palm rests for the user.

For applications where other positioning devices are better suited, the ergonomic positioning device provides a pass through facility for PS/2 positioning devices. Other aspects, features, and advantages of the present invention are disclosed in the detailed description that follows.

DESCRIPTION OF THE SEVERAL VIEWS OF THE DRAWING

The invention will be understood from the following detailed description in conjunction with the drawings, of which.

DETAILED DESCRIPTION OF THE INVENTION

The ergonomic positioning device is an accessory for a computer keyboard designed to be a cursor motion-control device that allows the user's hands to remain in typing position while using the ergonomic positioning device. The ergonomic positioning device further incorporates a keyboard tray with palm rests for ergonomic positioning during use on a desk or in non-desk use, such as resting the keyboard and ergonomic positioning device on the knees. The ergonomic positioning device provides a movable (rotatable and translatable) surface within reach of the user's thumbs when in normal typing position and manipulatable by the fingers without disruptive displacement of the hand. With an optionally enabled switch mounted so that it can be closed by depressing the movable surface, the ergonomic positioning device very closely emulates the action of a mouse producing a single button press action without perceptible x and y motion of the cursor. The ergonomic positioning device attaches to an existing keyboard, takes advantage of existing mouse drivers and allows connection of the ergonomic positioning device and another positioning device concurrently. Additional function buttons complete the mouse emulation. The movable surface is conveniently implemented as a rollerbar in one implementation to be fully described, but a rollerball and a surface supported by rolling mechanisms are alternate implementations.

Figure 1:
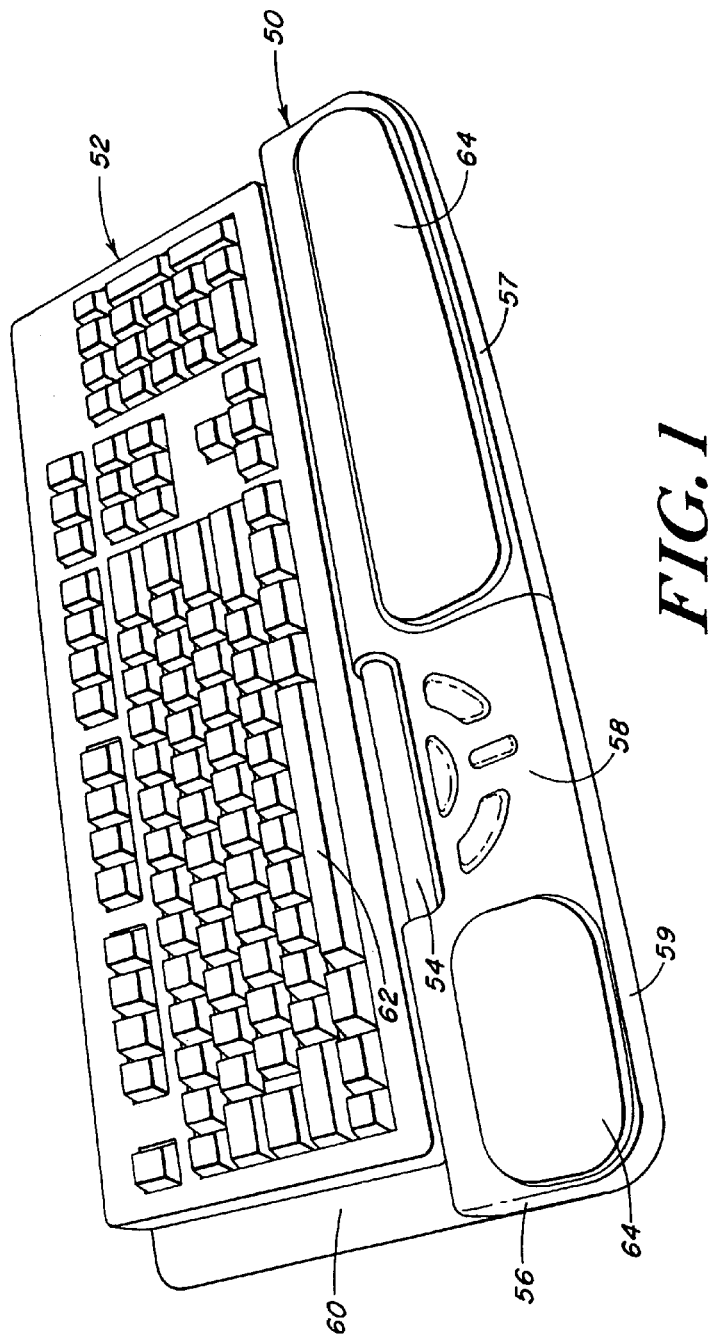
FIG. 1 is a perspective view of an ergonomic positioning device assembly with keyboard according to the invention.

FIG. 1 illustrates an embodiment of the ergonomic positioning device 50, implemented with a rollerbar 54, as utilized with a typical keyboard 52. The keyboard 52 rests on the keyboard tray 60 with an enclosure 56, having a longer right side 57 and a shorter left side 59, oriented to place the rollerbar 54 centered beneath the spacebar 62. Depressing the rollerbar 54 closes a switch (not shown) performing the same function as depressing a left button on a mouse. Function keys and scroll wheel 58 are centered on the ergonomic positioning device 50 further away from the spacebar 62 than the rollerbar 54. Palm rests 64 may be incorporated in the ergonomic positioning device 50.

The keyboard tray 60 is designed to slide under the keyboard 52 holding the enclosure 56 against the keyboard and providing a balancing point for non-desk uses. The keyboard tray 60 makes it convenient to utilize the keyboard 52 and ergonomic positioning device 50 together in a casual position, such as with the combination balanced on the user's knees.

When the keyboard 52 is positioned on the ergonomic positioning device 50, the user's thumbs and fingers easily reach the rollerbar 54, function keys and scroll wheel 58 with the hands in a touch-typing orientation. Rotation of the rollerbar 54 causes vertical cursor motion on a screen (not shown), while lateral motion of the rollerbar 54 causes a horizontal cursor motion on the screen. Rotation and translation simultaneously is also supported. The configurable function keys and scroll wheel 58 (described below) complete the replication of mouse functions.

Figure 2:
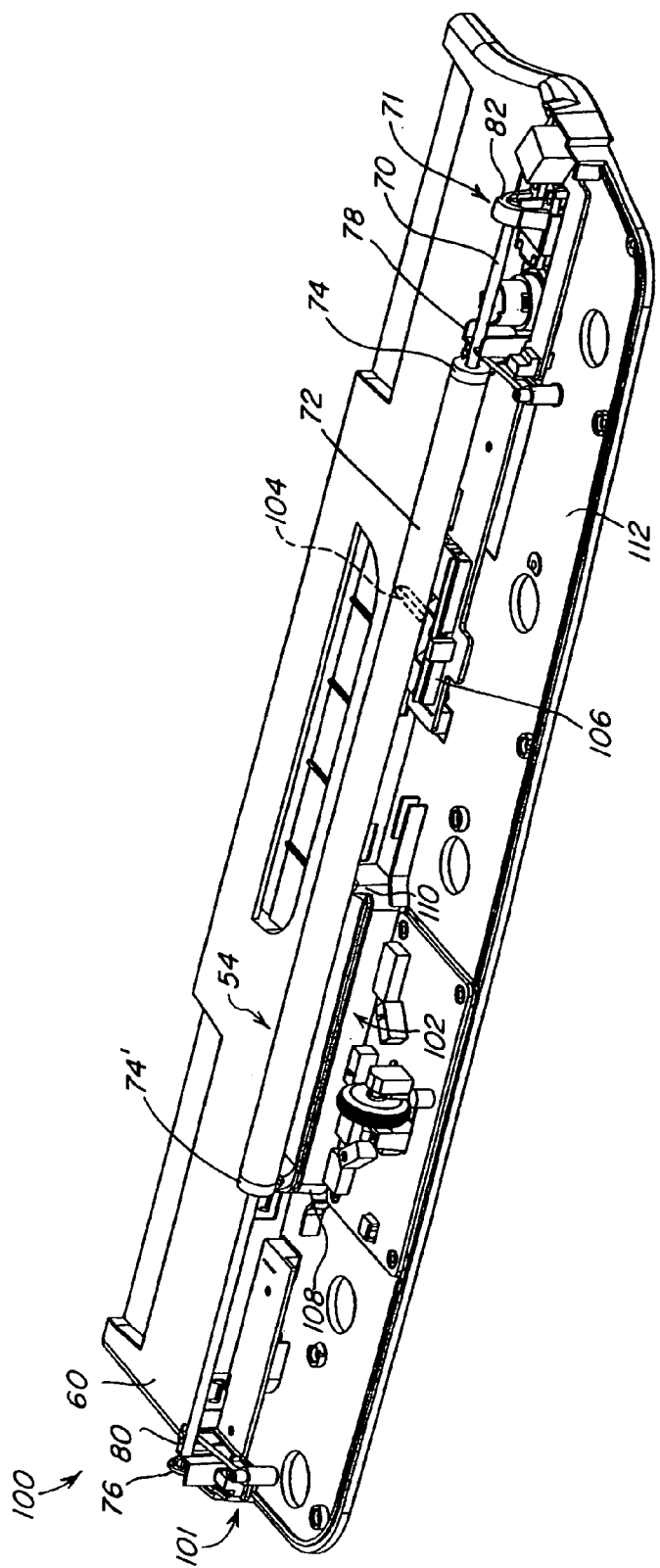
FIG. 2 is a perspective view of the ergonomic positioning device assembly of FIG. 1 with a cover removed.

FIG. 2 is an internal view of the ergonomic positioning device embodiment of FIG. 1. The rollerbar assembly 54 is composed of a durable metal rod 70, such as stainless steel or aluminum, thin enough that the rod has some springiness, that spans most of the width of the ergonomic positioning device 50. A sleeve 72 of light metal, ceramic or plastic with an inner diameter slightly greater than the outer diameter of the rod 70 surrounds a significant portion of the rod 70. In one embodiment, the sleeve 72 surrounds approximately 75% of the rod 70. In this implementation, the outer surface of the sleeve 72 is coated with a matte rubberized surface that provides a good tactile feel for the user. In one embodiment, the outer diameter of the sleeve is greater than 8 mm and preferably approximately 12 mm. The rollerbar may be configured differently as is discussed below. The sleeve 72 is closed with bearings 74, serving as a cap, of nylon, Teflon™, plastic or similar material having a centered hole with a diameter just slightly larger than the diameter of the rod 70. These bearings 74 cushion the ends of sleeve 72 and provide a bearing surface that allows the sleeve 72 to move easily around and along the rod 70. An end cap 76 is fastened to an end of rod 70 distal from a mounting arrangement 71.

Figure 3:
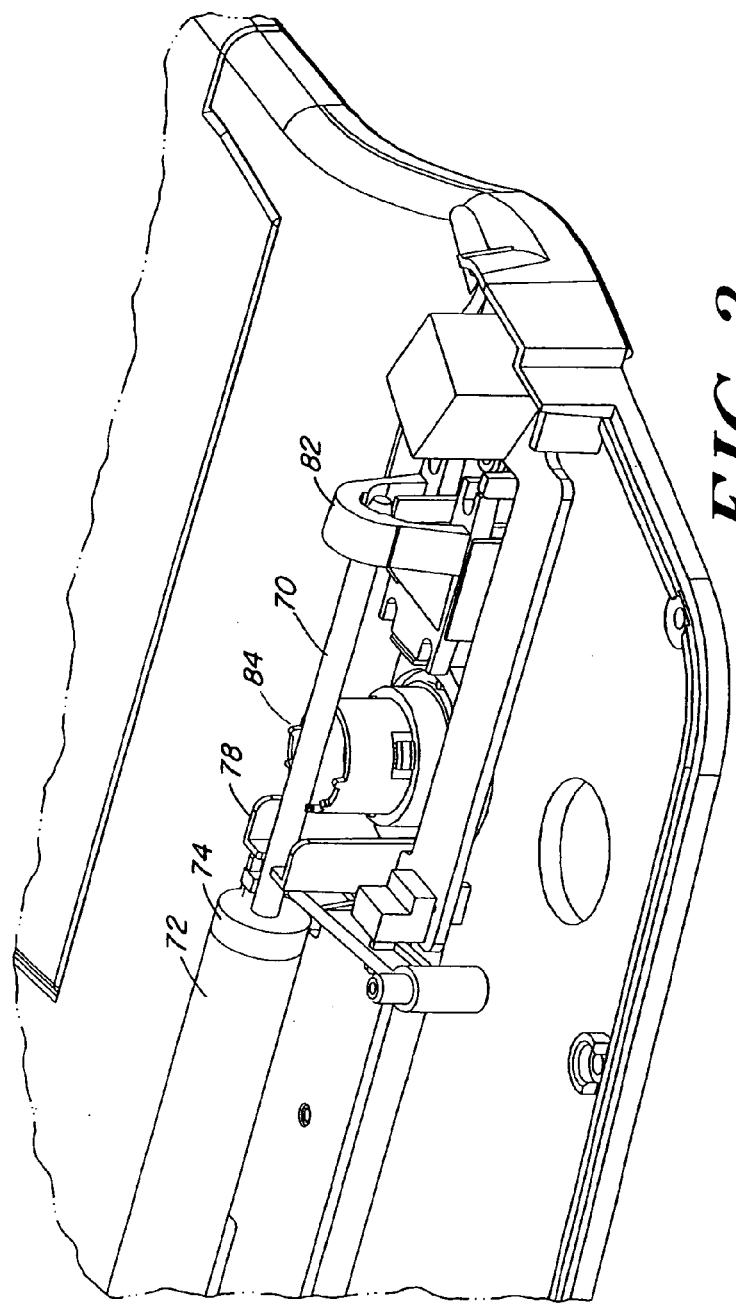
FIG. 3 is a detail view of a rollerbar support assembly according to the invention.

FIG. 3 illustrates an end support of the rod 70 where it is cantilevered from a mount 82. The rod 70 is supported in mount 82 at an upward angle from horizontal, the angle sufficient to cause the rod 70 to form a bow between the mounting arrangement 71 and the distal end 100 of the rod 70. Typically, this angle is between approximately ½ and 3°. In an alternate embodiment (not shown), the rod 70 is mounted horizontally in a block and the block is tilted upward relative to the base 112 of the ergonomic positioning device 50 by an adjustable screw to from the bow.

The end cap 76 of the rollerbar 54 terminates approximately horizontally level with the mount 82. The end cap 76 is floating on an end switch (not shown) in the rest position. The rollerbar 54 forms a slightly bowed shape. The bowed rollerbar 54 has a measure of springiness that is utilized in depressing the end switch as described below. The exact shape of the rollerbar arch is adjustable by a tension adjuster 84 shown in FIG. 3. The tension adjuster 84 is spaced slightly away from the mount 82. The rod 70 rests on the tension adjuster 84. If the height of the tension adjuster 84 is increased from the minimum, the angle of the rollerbar 54 from horizontal is increased from the angle established by the mounting arrangement 71. This greater angle increases the force needed to close the switch as discussed below, thereby minimizing inadvertent switch closures.

Figure 4:
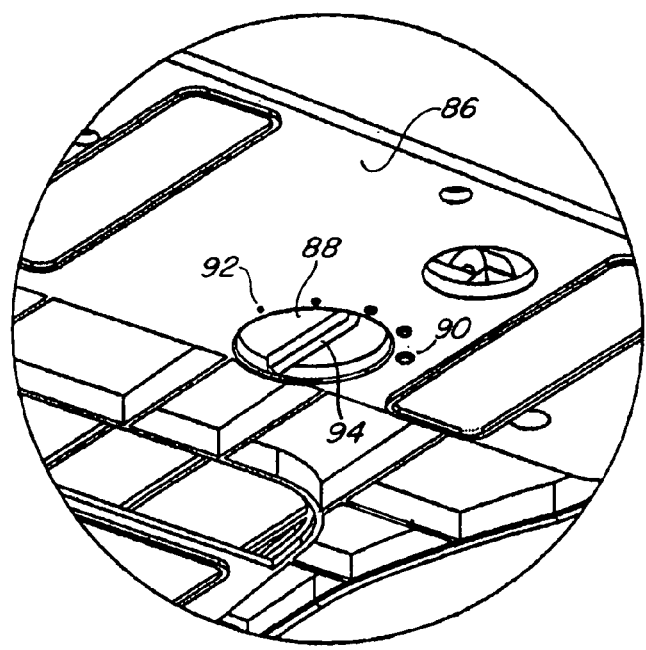
FIG. 4 is a bottom view of the ergonomic positioning device of FIG. 1.

FIG. 4 illustrates the way the tension adjuster 84 is set. Dial 88 is accessible from the bottom 86 of the ergonomic positioning device 50. As shown in the detail of FIG. 4, there are multiple tension settings ranging from the slightest 92 to the largest 90. As the user moves pointer 94 to turn the dial 88, the height of tension adjuster 84 under rollerbar 54 increases, producing the tension best suited to the user's touch.

Figure 5:
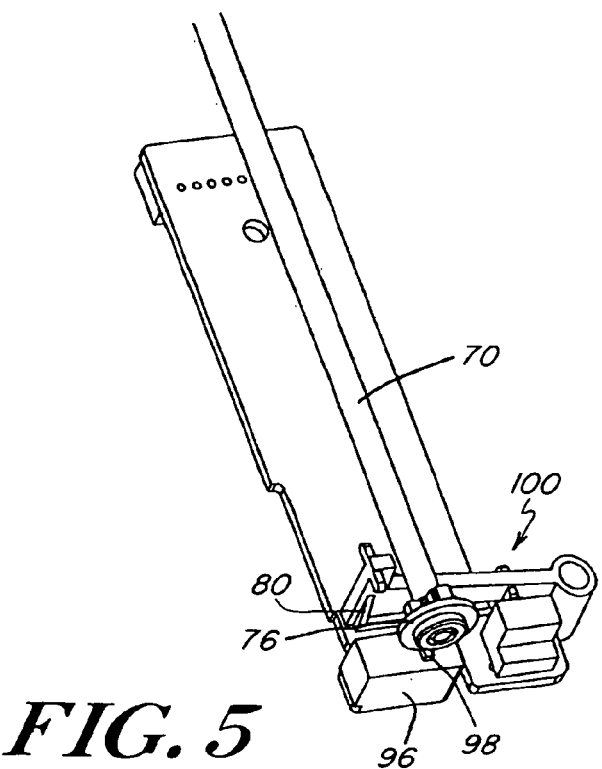
FIG. 5 is an end view of the rollerbar of FIG. 3.

FIG. 5 illustrates the switch mechanism for a clickable rollerbar 54. The distal end 100 of the rollerbar 54 passes through alignment gateway 80 before being capped with end cap 76 that rests on a microswitch 98 mounted vertically on its housing 96. When the highest tension from tension adjuster 84 is applied, the end cap 76 of rollerbar 54 floats, barely touching the switch 98. Even when the user applies some pressure to the sleeve 72 to roll and slide the rollerbar 54, the switch 98 is not activated. However, when the user deliberately presses on the rollerbar 54, the bow of the rollerbar 54 is flattened and the switch 98 is activated. In some embodiments, as is known in the industry, the switch 98 emits an audible click coincident with its activation. The click provides instantaneous feedback to the user. The ability to move the cursor with the rollerbar 54 and select a function by "clicking" the rollerbar 54 most closely matches the physiological process achieved with a mouse.

As can be seen in FIG. 2, an access enclosure 102 defines the area for user interaction with the rollerbar 54. The access enclosure 102 is positioned to align with the keyboard spacebar 62 and is midway between a sensor 106 that monitors rollerbar movement and the left end 101 of the ergonomic positioning device 50 assembly. The access enclosure 102 is always spanned by a part of the sleeve 72 of the rollerbar 54 and the sleeve 72 does not normally touch the edges of the access enclosure 102. As the bar is translated, the distal end 74' of sleeve 72 lies in the area between alignment gateway 80 and the distal end 108 of the access enclosure 102. The proximate end 74 of sleeve 72 lies in the area between alignment gateway 78 and a spot 104 near the proximate edge of the sensor 106. The sensor 106 is placed at the location shown to assure that a portion of the sleeve 72 always remains over the sensor 106 while allowing maximum horizontal traverse of the rollerbar 54. This location is displaced from the proximate end 110 of the access enclosure 102 by approximately the distance that distal end 74' travels. In a preferred embodiment, the rollerbar is adapted to traverse a left travel distance and an activation distance, and the focus area is located at approximately the sum of two times the left travel distance plus the activation distance from the left end of the rollerbar.

Optical mouse sensors were developed to be used in optical mouses where the sensor is focused on a flat surface lying a fixed distance beneath the mouse. These sensors monitor the texture of the surface passing beneath the sensor, comparing successive images to determine the movement of the mouse. After research, it was found that the Solid-State Optical Mouse Sensor HDNS-2000 from Agilent Inc. could be focused on a rounded surface such as a cylindrical tube. The sensor focus is aligned with the axis of the tube to provide a sufficiently flat monitored surface. For suitably textured surfaces, the movement of cylinders having a diameter as small as 8 mm can be reliably tracked.

Figure 6:
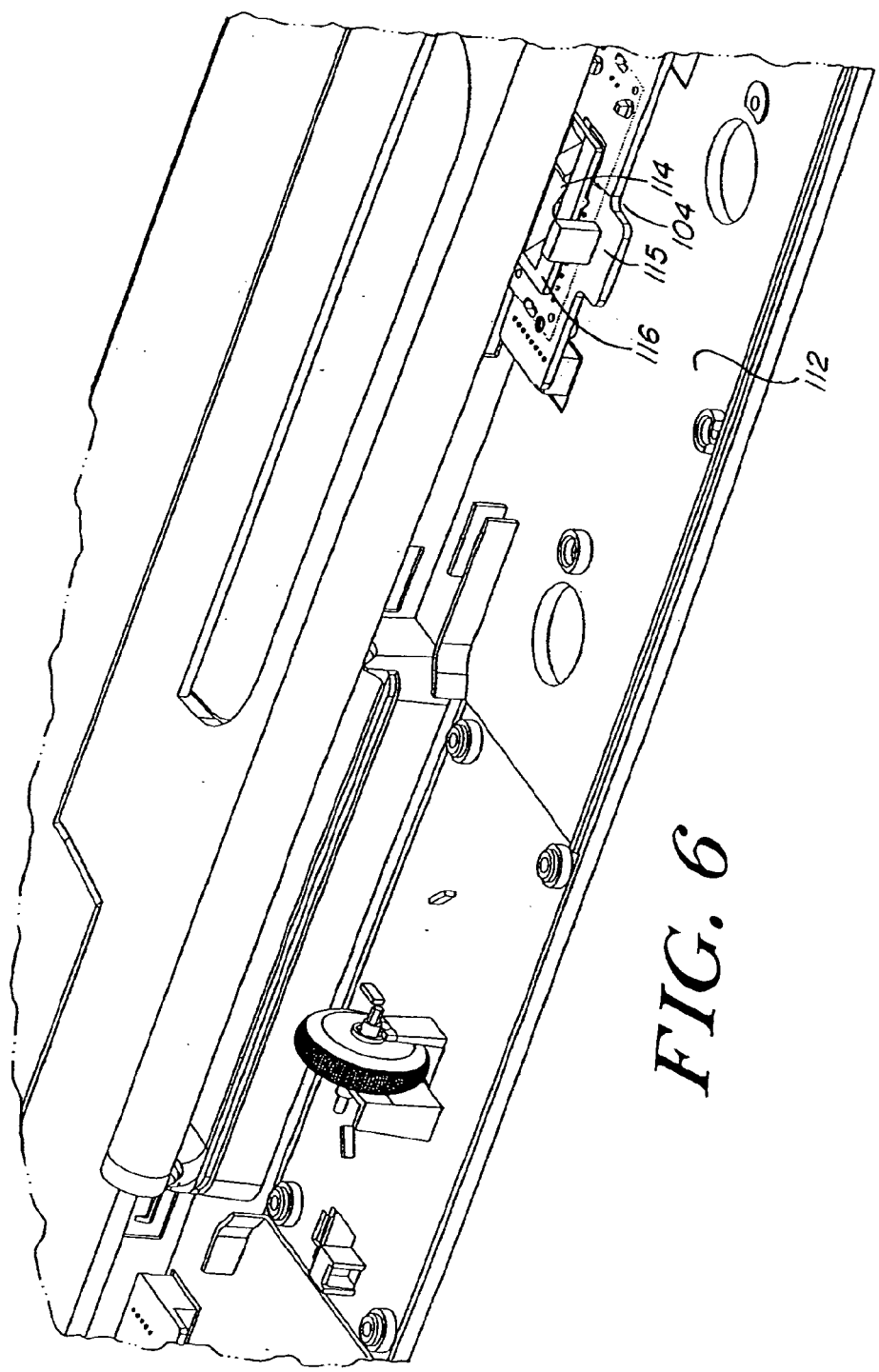
FIG. 6 is a detail view of an optical sensor mounting according to the invention.

As illustrated in FIG. 6, in the ergonomic positioning device, an optical mouse sensor 106, such as the Solid-State Optical Mouse Sensor HDNS-2000 from Agilent Inc. is mounted beneath the rollerbar 54 through a printed circuit board 115 and touching, or through, a base plate 112. The optical sensor 106 is aligned with the axis of the rollerbar and focuses upward at the cylindrical sleeve 72. The single sensor 106 is very high resolution and detects the rotational and translational movement of the rollerbar 54. For the clickable rollerbar 54 of FIG. 6, the sensor 106 is placed so that the vertical motion of the bar 54 when "clicked" has minimal effect on the focus of the sensor 106. Keeping the distance between the mount 82 and the sensor 106 to a minimum optimizes the insensitivity to vertical motion. While the insensitivity to vertical motion could be further reduced, a measure of the horizontal range of the sleeve 72 would have to be sacrificed, as discussed above. Therefore, the proximate end 74 of the sleeve 72 travels between the position shown in FIG. 2 and position 104, while the distal end 74' of sleeve 72 travels between the access gateway 80 and the end 108 of the access enclosure 102.

One implementation of the motion sensor 58 functions by comparing images of the sleeve 72 at known time intervals to determine the movement. The sensor 106 detects patterns in sleeve 72 that may be coated with a rubber-like compound for tactile feedback to the user. The sleeve 72 and sensor 106 are spaced so that, when the rollerbar 54 is in the normal position, the lowest point of the sleeve 72 is centered in the focal range of the sensor 106. As the rollerbar 54 is depressed, it remains essentially in focus. FIG. 6 illustrates a sensor mounting arrangement that has the sensor mechanism 114 mounted facing upward in a base plate/clip 116 that is fitted in the circuit board 115. Alternate arrangements of rollerbar 54 and sensor 106 are discussed below.

Figure 7:
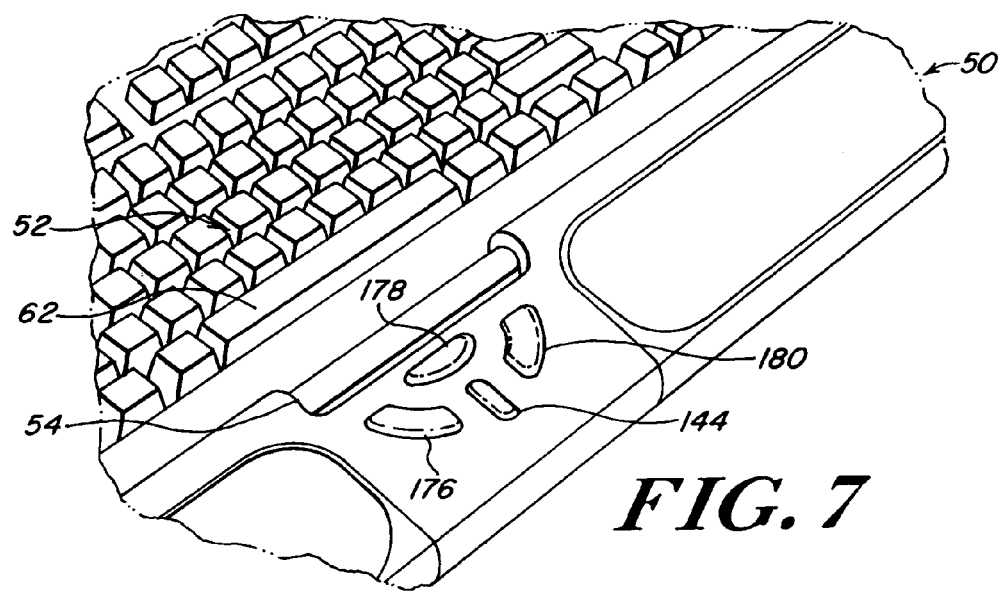
FIG. 7 is a close-up perspective view of the rollerbar and spacebar of the ergonomic positioning device of FIG. 1.
Figure 8:
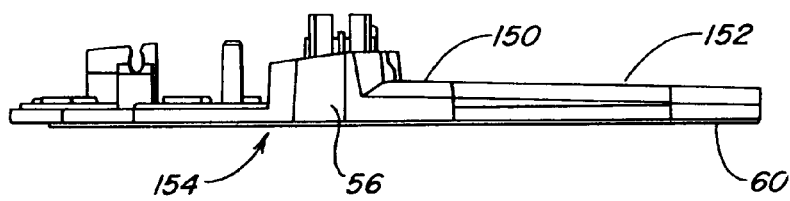
FIG. 8 is a side view of a keyboard tray according to the invention.

FIG. 7 illustrates the relationship of a typical keyboard 52 and the ergonomic positioning device 50. It is desirable that the keyboard space bar 62 be higher than any functioning surface on the ergonomic positioning device 50, and in particular that the movable surface (rollerbar 54) be lower than the space bar 62. In the typical keyboard 52, the space bar 62 is 28 mm above the surface on which the keyboard 52 rests. In the embodiment of FIG. 2, the minimum height of the sensor 106 facing upward toward the rollerbar 54 is 21 mm high and the rollerbar 54 with sleeve 72 is from 8 to 12 mm in diameter, placing the top surface of the rollerbar 54 above the spacebar 62. FIG. 8 illustrates how the ergonomic positioning device 50 corrects this by raising the back 150 of the enclosure 56 and the top 152 of the keyboard tray 60 sufficiently to lift the spacebar 62 above the rollerbar 54. Alternate layouts, as discussed below also minimize the height discrepancy.

Figure 9:
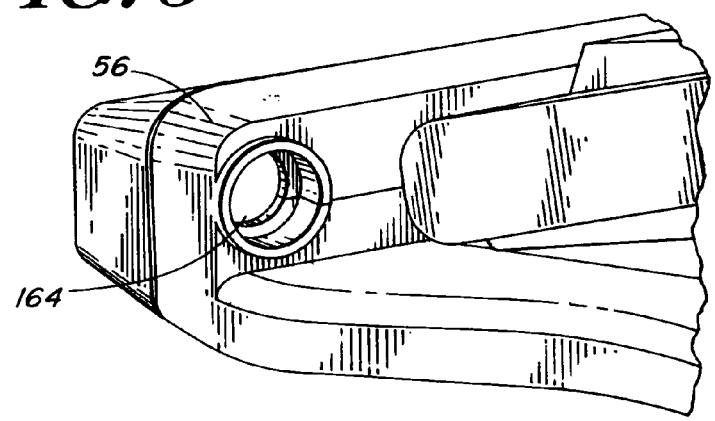
FIG. 9 is a perspective view of a PS/2 port for an alternate positioning device in the ergonomic positioning device assembly of FIG. 1.
Figure 10:
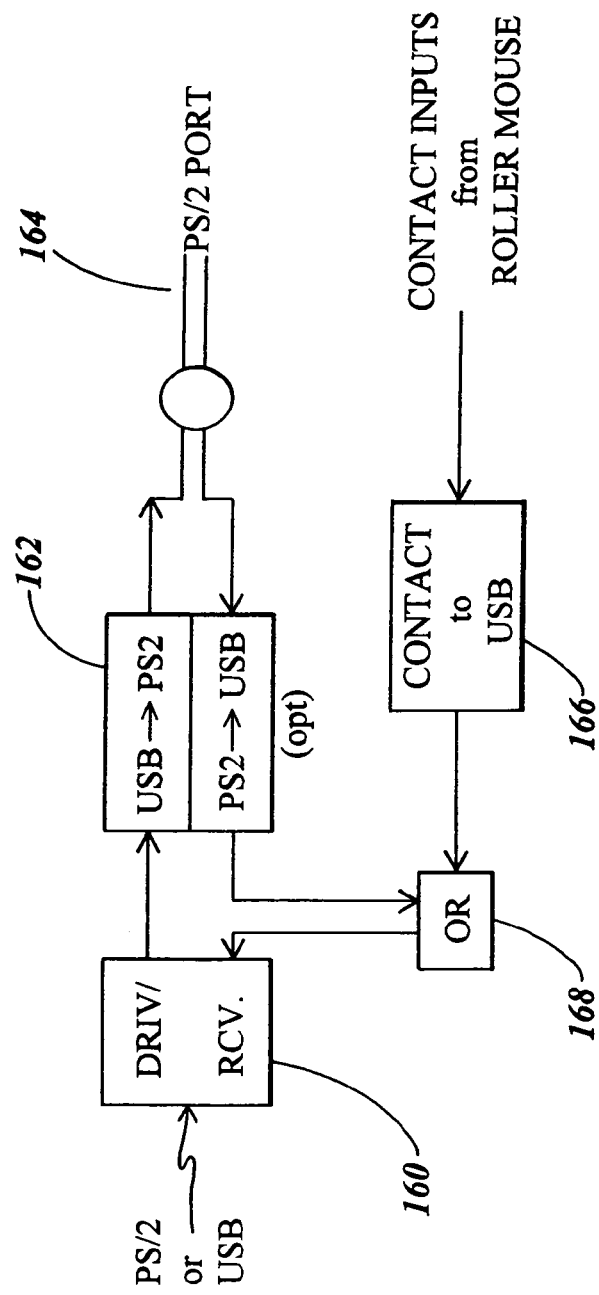
FIG. 10 is a block diagram of logic associated with an auxiliary positioning device according to the invention.

The ergonomic positioning device 50 can utilize either a USB or PS/2 serial connection to a computer system. While the USB connection provides a daisy chain capability, the PS/2 serial protocol does not. The ergonomic positioning device 50 facilitates the concurrent connection of a PS/2 compatible device (not shown) to the computer with the connection of the ergonomic positioning device 50. As shown in FIG. 9, the ergonomic positioning device 50 incorporates a PS/2 port 164 on the backside of the enclosure 56 for connecting an additional PS/2 device. Internal logic, as illustrated in FIG. 10, passes the bus functions received at block 160 onto the PS/2 port 164 after passing through a conversion block 162 if necessary. Signals returning from the PS/2 port 164 are ORed in block 168 with switch closures and sensor inputs at block 166 from the ergonomic positioning device 50. In this way, any combination of switch closures and cursor controls of either the ergonomic positioning device 50 or the PS/2 device may be used to interact with the computer.

Figure 11:
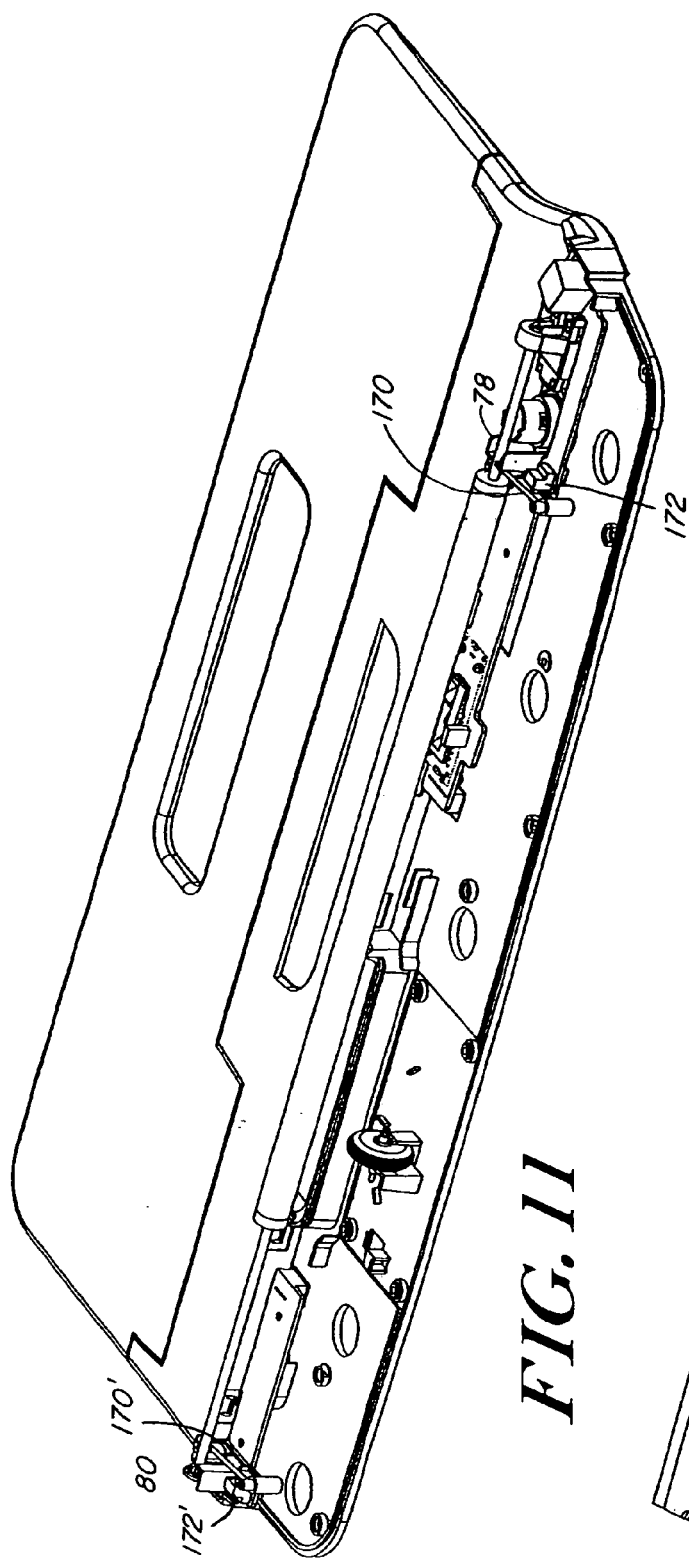
FIG. 11 is a view of the internals of the ergonomic positioning device assembly according to the invention.

When the ergonomic positioning device 50 is implemented with a rollerbar 54, there is an issue of the rollerbar 54 running out of area for horizontal travel. Coping with this issue is addressed in one of two ways, with and without edge detection. FIG. 11 illustrates the mechanisms used when edge detection is enabled. When the rollerbar reaches one of the travel limits, a limit lever 170, 170' is pushed into the alignment gateways 78, 80 causing the limit lever 170, 170' to depress a limit switch 172, 172'. When either limit switch 172, 172' is depressed and edge detection is enabled, a cursor tracking function based on the sensor 106 output is suspended for a specified time. The specified time is long enough for a user to reposition the rollerbar 54 away from the travel limit. When the specified time expires, physically tracking the rollerbar 54 is restarted, while the cursor tracking function is reactivated at the prior screen location. If the user has repositioned the rollerbar 54, further horizontal travel in the direction of the previous limit is now available.

When edge detection is disabled, the cursor tracking function stops the screen horizontal cursor travel when the rollerbar 54 hits a limit lever (for instance lever 170). The user can free the up horizontal travel distance by driving rollerbar 54 into the opposite limit lever (for instance 170') which causes the cursor tracking function to position the cursor at the screen edge corresponding to the opposite limit lever. The user now has the full horizontal travel distance of the rollerbar 54 available in the previously blocked direction.

Figure 12:
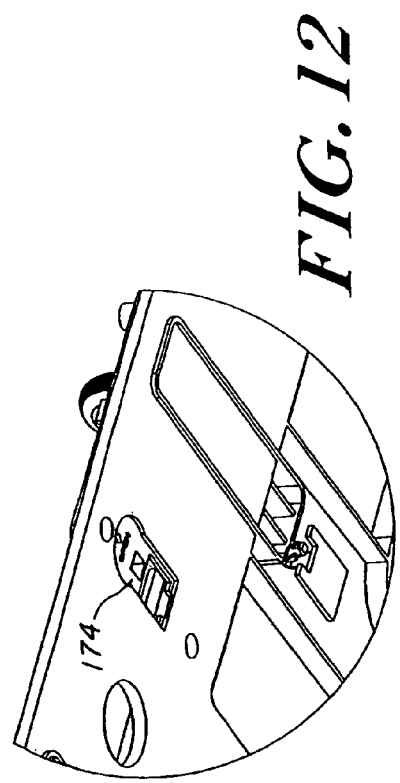
FIG. 12 is a view of the underside of an ergonomic positioning device according to the invention.

The configurable functions of the ergonomic positioning device 50 are controlled by DIP switches accessible from the bottom of the ergonomic positioning device 50 as shown in FIG. 12. In one embodiment, panel 174 is removable, revealing 8 switches. The switches control functions as detailed in Table 1.

TABLE 1

| Switch(es) | Function |
| --- | --- |
| Switch 1 | Turn Bar click ON and OFF |
| Switch 2 | Turn End Detection ON and OFF |
| Switches 3 & 4 | See Table 2 - Control Left Button |
| Switches 5 & 6 | See Table 2 - Control Middle Button |
| Switches 7 & 8 | See Table 2 - Control Right Button |

TABLE 2

| Action | Even Switch ON | Even Switch OFF |
| --- | --- | --- |
| Odd Switch ON | Left Single Click | Left Double Click |
| Odd Switch Off | Drag Lock | Right click |

FIG. 7 shows the three configurable function buttons, left—176, middle—178 and right—180, that are positioned below rollerbar 54. Table 2 detailed how each button can be configured to function as a specific mouse button as is known in the industry. Further fixed function buttons, such as the scroll wheel 144 and others may be incorporated in the ergonomic positioning device. Further, the buttons shown may be repositioned within thumb activation range as desired. If more than one function button is configured as the same mouse button, the ergonomic positioning device 50 presents the OR of these function buttons as one button press to the computer.

Figure 13:
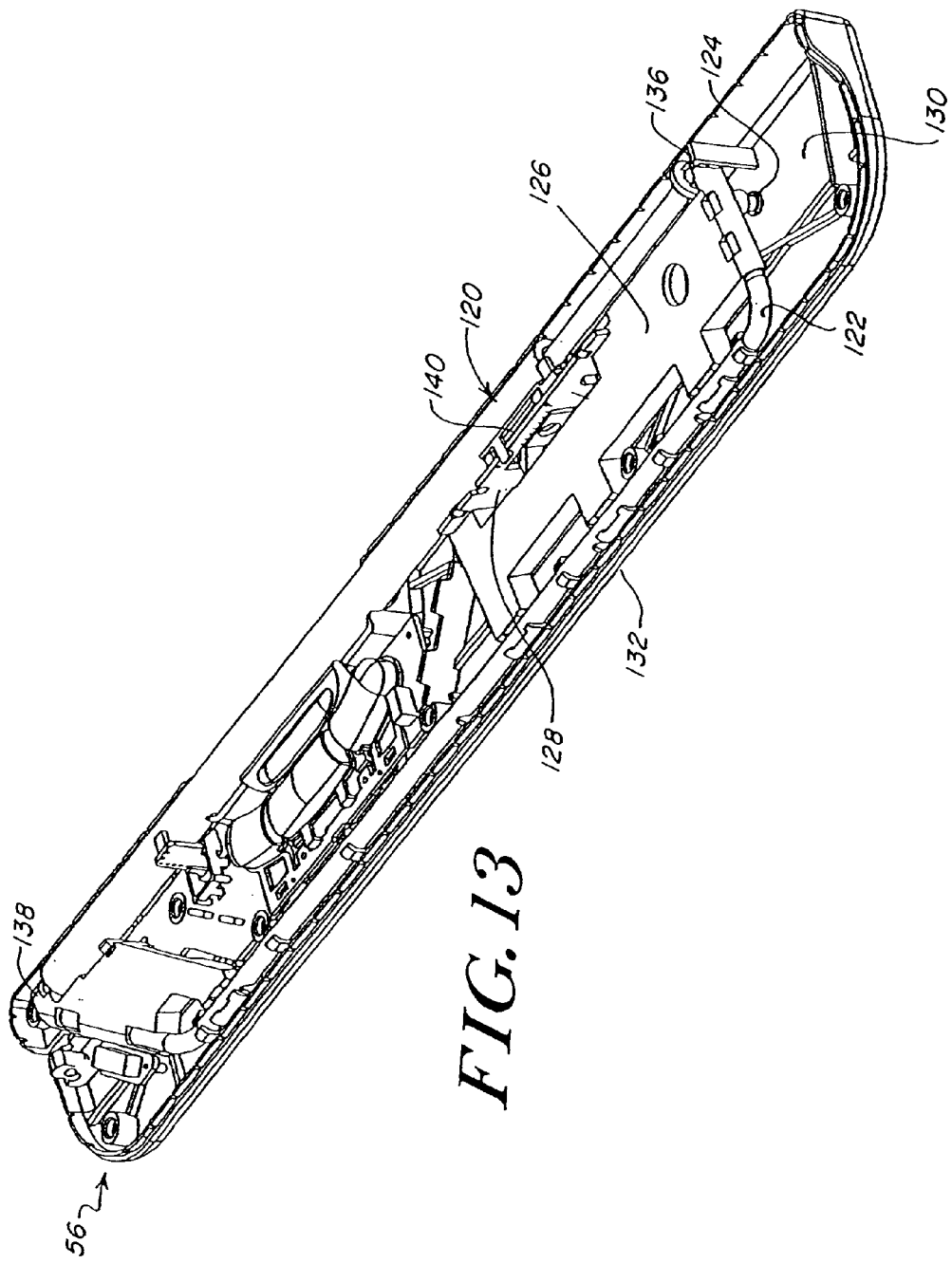
FIG. 13 is a perspective view of an alternate rollerbar and sensor assembly according to the invention.

An alternate arrangement of the sensor and rollerbar is shown in FIG. 13. This arrangement allows the sensor 128 to focus on the clickable rollerbar 120 from the side. The rollerbar 120 is formed as described above, but is not cantilevered from a mount. Rather, the rollerbar 120 is supported by a U-shaped bracket 122 held to the base 130 at the front 132 of the enclosure 56. The ends 136, 138 of the bracket are supported on springs 124 before supporting the rollerbar 120. The sensor 128 is focused on the side of the rollerbar 120 with the focal plane spaced in the same manner as described above. However, in this arrangement, the sensor mount 140 cannot be fixed to the base 130 of enclosure 56. Fixed mounting with the sensor 128 focused horizontally on the rollerbar 120, would cause the axis of rollerbar 120 to pass out of focal range when the rollerbar 120 is depressed. Therefore, a circuit board 126 is mounted on the bracket 122 and the sensor 128 is mounted on the circuit board 126. The entire arrangement of sensor 128 and rollerbar 120 move vertically together. When a user depresses the rollerbar 120, the springs 124 are compressed and a switch (not shown) is activated. The sensor assembly 128 moves with rollerbar 120, staying focused on the rollerbar 120 as it is depressed.

Figure 14:
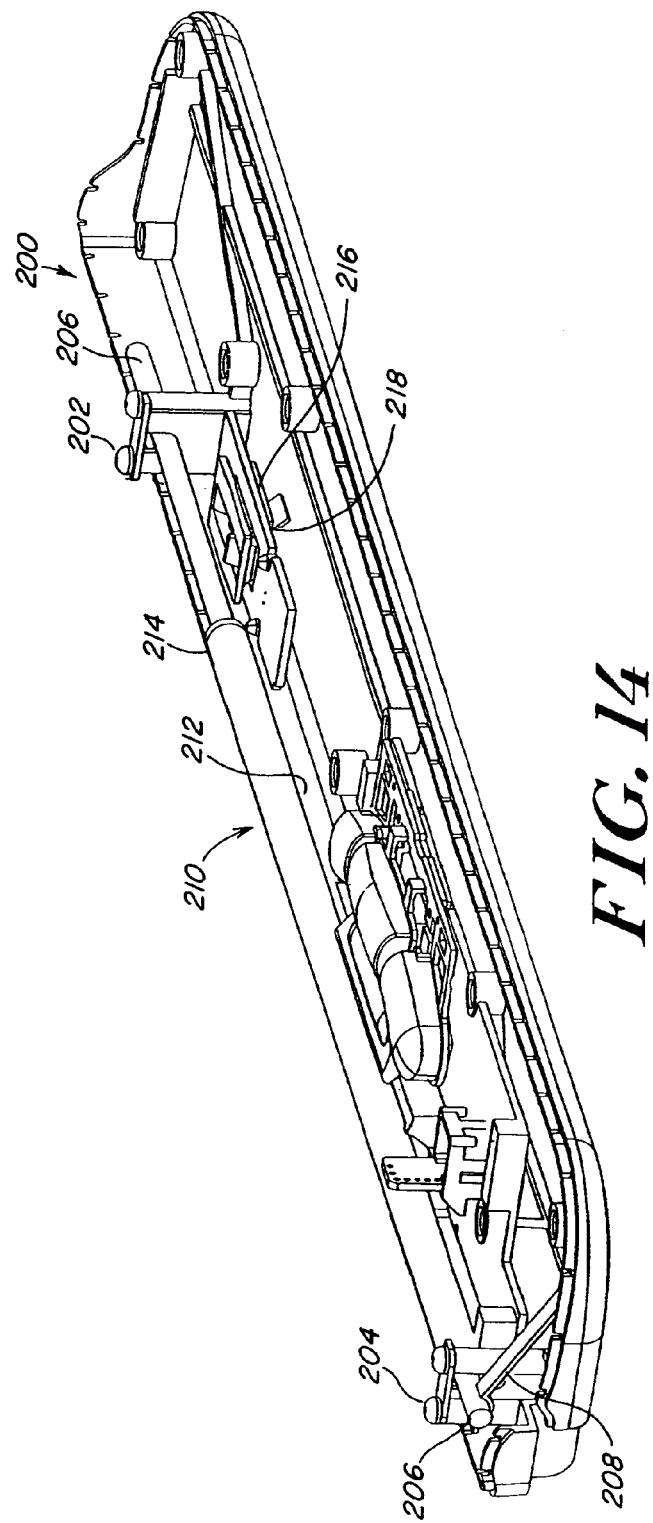
FIG. 14 is an illustration of an alternate embodiment of a rollerbar mounting mechanism.

In an alternate embodiment, as shown in FIG. 14, the internal arrangement of the rollerbar assembly 200 consists of a support 202, and a guide 204 at respective ends of the inner rod 206. These structures 202, 204 may have a Teflon™, nylon, or plastic bearing surfaces, but do not necessarily incorporate one. One end of the inner rod 206 rests on a spring 208 that allows the rollerbar 210 to function as a mouse button. The tension of the spring is adjusted by a tension screw (not shown). A brace 212 at approximately the midpoint of the length of the inner roller 206 restricts the downward movement of the rollerbar assembly 210 when it is being depressed.

The sensor 216 for this embodiment is mounted below the rollerbar assembly 210 aligned with the axis of the rollerbar 210 toward the end not having the spring. The sensor 216 incorporates an optical sensor 218 such as previously described. The rollerbar assembly 210 does not move out of range of the sensor 216 when the rollerbar 210 is depressed. The sensor 216 monitors rotations and translations of an outer sleeve 214 as previously described.

Figure 15A:
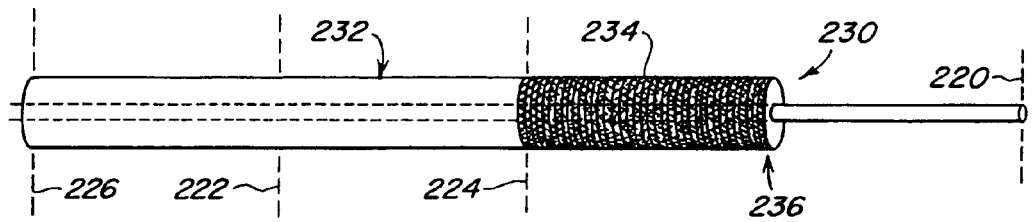
FIGS. 15A, 15B and 15C are alternate embodiments of rollerbars according to the invention.
Figure 15B:
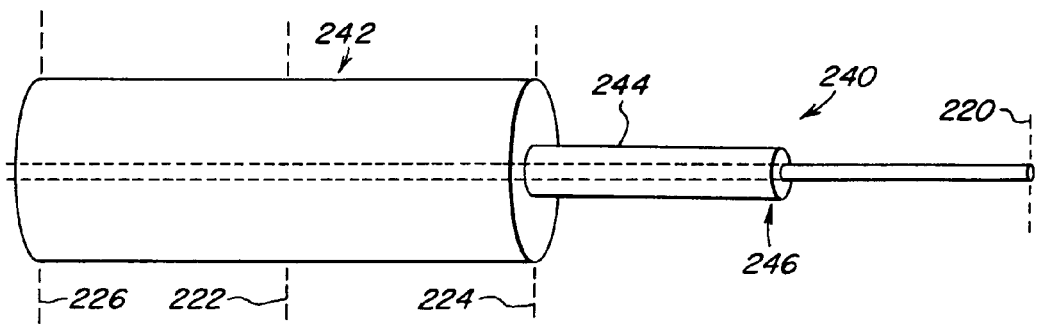
Figure 15C:
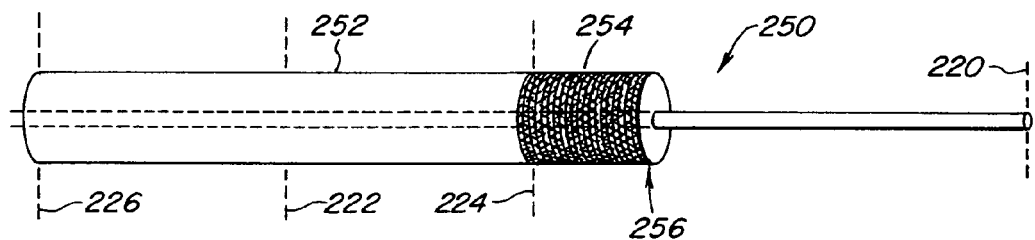

Alternate embodiments of the rollerbar utilizable in the ergonomic positioning device 50 are illustrated in FIGS. 15A, 15B, and 15C. Common features of these embodiments are the right-hand end of the rollerbar rod 220, the right-hand end of the access area 224, the left-hand end of the access area 222, and the left-hand end of the keyboard 226. FIG. 15A illustrates a rollerbar 230 having two different textures. Area 232 comprises a sleeve area that is accessible to the user and may have surface chosen for user convenience, such as a hard shiny texture. Area 234 comprises a sleeve area optimized for sensor tracking, with a roughly textured surface. When rollerbar 230 is clickable, an optical sensor is focussed at approximately location 236, a rightmost location always focussed on surface 234 while allowing left and right movement of sleeve 232/234.

FIG. 15B illustrates a rollerbar 240 having two different diameters. Area 242 comprises a sleeve area that is accessible to the user and has a diameter and surface chosen for user convenience, such as a relatively large diameter hard shiny surface. Area 244 comprises a sleeve area optimized for compact packaging and sensor tracking. The smaller diameter of sleeve 244 limits the excess height accumulated when the sensor is placed beneath sleeve 244, while allowing for the ergonomic benefits of the larger diameter sleeve for user access. When rollerbar 240 is clickable, an optical sensor is focused at approximately location 246, a rightmost location always focussed on surface 244 while allowing left and right movement of sleeve 242/244.

FIG. 15C illustrates a rollerbar 250 adapted for a non-clicking application. When the entire sleeve 252/254 is uniform, the sensor can be focussed on location 256 allowing more freedom in component placement. If the split sleeves illustrated in FIGS. 15A and 15B are used, the sensor placement is constrained by the limitation that sleeve 254 must always be within focal range. However, the sensor does not have to be placed beneath the rollerbar for non-clicking applications.

Figure 16:
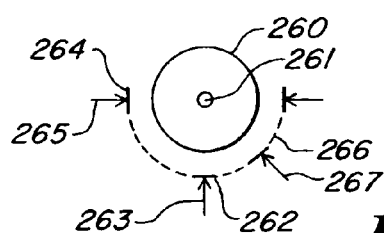
FIG. 16 is an end view of a rollerbar illustrating possible placements of a sensor according to the invention.

For rollerbars that do not click, there is greater freedom in the placement of sensor. Since the non-clicking rollerbar, does not move vertically, the sensor can be positioned at any orientation that aligns the focus with the axis of the rod. FIG. 16 illustrates that rollerbar 260 centered on rod 261, may have a sensor mounted in orientations 262, 264, or 266 as long as the focus is aligned as shown by arrows 263, 265, and 267. Intermediate positions are also possible. While sensor positions above the midline of the rod are possible, they increase the height of the rollerbar enclosure 56 disadvantageously.

The ergonomic positioning device 50 has been illustrated with the rollerbar 54 positioned closest to the keyboard and function keys positioned more distant from the keyboard. It is apparent to those knowledgeable in the art, that swapping the location of rollerbar and function keys, while maintaining both in approximately the distance from the spacebar shown above, is within the art.

In addition to the embodiments described above, the palm rests can be exchanged with alternate rests of a different material and/or different shape. It is within the spirit of the invention to incorporate multiple function keys in the ergonomic positioning device with some set of these function keys field configurable. A ergonomic positioning device that implements the left mouse button function only via function keys rather than via a "clickable" rollerbar is a supported alternative embodiment.

Having described preferred embodiments of the invention it will now become apparent to those of ordinary skill in the art that other embodiments incorporating these concepts may be used. Accordingly, it is submitted that the invention should not be limited by the described embodiments but rather should only be limited by the spirit and scope of the appended claims.

What is claimed is:

1. An optical sensor assembly for tracking movement of a surface comprising:
   a curved or rounded target comprising said surface movably mounted to present a varying segment of said surface to a focus area, wherein said target is cylindrical; and
   an optical sensor comprising a single sensing component, said sensing component mounted facing said surface of said target at said focus area, said optical sensor operative to compare images of said surface at known time intervals, wherein the single sensing component of said optical sensor detects a change in position of said surface in multiple directions, and said optical sensor is aligned placing said focus area perpendicular to a longitudinal axis of said cylindrical target and said surface is the circumferential surface of said cylindrical target.

2. The optical sensor assembly of claim 1 wherein said optical sensor is positioned substantially beneath said surface.

3. The optical sensor assembly of claim 1, wherein said cylinder has a diameter greater than approximately 8mm.

4. The optical sensor assembly of claim 3 wherein said cylinder has a diameter between approximately 8mm and 12mm.

5. The optical sensor assembly of claim 1, wherein said surface tracked by said optical sensor is textured.

6. The optical sensor assembly of claim 1 wherein said surface is adapted to move vertically and the response of said optical sensor is substantially invariant to said vertical motion.

7. The optical sensor assembly of claim 6 wherein said optical sensor is positioned perpendicular to and beneath said surface.

8. The optical sensor assembly of claim 6 further comprising a switch disposed beneath a portion of said surface, wherein said vertical movement of said surface activates said switch.

9. The optical sensor assembly of claim 6 wherein said optical sensor moves with said surface maintaining a constant distance and orientation to said surface.

10. A mouse replacement device comprising said optical assembly of claim 1 and a rollerbar having a left end and a mounting end, wherein said rollerbar is adapted to traverse a left travel distance and an activation distance, and said focus area is located at approximately the sum of two times said left travel distance plus said activation distance from said left end of said roller bar.

11. The mouse replacement device of claim 10 wherein said rollerbar has a first portion having a shiny hard surface and a second portion having a textured surface, said sensing component focused on said second portion.

12. The optical sensor assembly of claim 1, wherein the surface of said target is cylindrical.

13. The optical sensor assembly of claim 1, wherein the surface of said target comprises a rollerbar.

14. The optical sensor assembly of claim 1, wherein the surface of said target comprises a surface supported by a rolling mechanism.

15. The optical sensor assembly of claim 1, wherein said surface is translatably and rollably mounted to present the varying segment of said surface to the focus area.

16. The optical sensor assembly of claim 1, wherein the single sensing component is operative to sense translational motion and rolling motion of said surface.

17. The optical sensor assembly of claim 1, wherein said surface is translatably and rotatably mounted to present the varying segment of said surface to the focus area.

18. The optical sensor assembly of claim 1, wherein the single sensing component is operative to sense translational motion and rotational motion of said surface.

19. The optical sensor assembly of claim 1, wherein the optical sensor is operative to detect patterns in the surface, the patterns comprising the images to be compared.

20. A cursor control device comprising:
    a base;
    a support mechanism supported on said base;
    a curved or rounded target comprising a surface movably mounted on said support mechanism to present a varying segment of said surface to a focus area, wherein the surface is translatably supported by said support mechanism; and
    an optical sensor comprising a single sensing component, said sensing component mounted facing said surface of said target at said focus area, said optical sensor operative to compare images of said surface at known time intervals, wherein the single sensing component of said optical sensor detects a change in position of said surface in multiple directions.

21. The cursor control device of claim 20, wherein the support mechanism comprises a member extending from a first end to a second end.

22. The cursor control device of claim 20, wherein the support mechanism comprises a member extending from a support element at a first end to a support element at a second end.

23. The cursor control device of claim 20, wherein the support mechanism comprises a member extending from a support element at a first end to a spring member at a second end.

24. The cursor control device of claim 20, wherein the support mechanism comprises a member extending from a mount at a first end to a switch mechanism at a second end, the support member disposed for reciprocal translation having a vertical component into and out of contact with the switch mechanism.

25. The cursor control device of claim 20, wherein the surface is rollably supported by said support mechanism.

26. The cursor control device of claim 20, wherein the surface is rollably supported by a bearing mechanism on said support mechanism.

27. The cursor control device of claim 20, wherein the surface is translatably supported by a bearing mechanism on said support mechanism.

28. The cursor control device of claim 20, wherein the surface comprises a sleeve rotatable via a bearing mechanism around the support mechanism and translatable along the support mechanism, rotation and translation of the sleeve being interpretable by the sensor.

29. The cursor control device of claim 20, wherein the surface has a matte texture.

30. The cursor control device of claim 20, wherein the surface is texturized.

31. The cursor control device of claim 20, wherein the surface of said target is cylindrical.

32. The cursor control device of claim 20, wherein said surface is translatably and rollably mounted to present the varying segment of said surface to the focus area.

33. The cursor control device of claim 20, wherein the single sensing component is operative to sense translational motion and rolling motion of said surface.

34. The cursor control device of claim 20, wherein said surface is translatably and rotationally mounted to present the varying segment of said surface to the focus area.

35. The cursor control device of claim 20, wherein the single sensing component is operative to sense translational motion and rotational motion of said surface.

36. The cursor control device of claim 20, wherein the support mechanism comprises a member extending from a first end to a second end, the member cantilevered from a mount at the first end.

37. The cursor control device of claim 36, wherein the first end of the member extends from the mount at an upward angle to form a bow in the member between the first end and the second end.

38. The cursor control device of claim 36, wherein the second end floats on a switch in a rest position.

39. The cursor control device of claim 20, wherein the support mechanism comprises a member having a bowed shape from a first end to a second end.

40. The cursor control device of claim 20, wherein the support mechanism comprises a springy member having a bowed shape from a first end to a second end.

41. The cursor control device of claim 40, further comprising a tension adjustment device disposed to adjust the bowed shape of the springy member.

42. The cursor control device of claim 41, wherein the tension adjustment device is disposed to adjust the angle of the springy member from horizontal at the first end.

43. The cursor control device of claim 20, wherein the optical sensor is operative to detect patterns in the surface, the patterns comprising the images to be compared.

44. An optical sensor assembly for tracking movement of a surface comprising:
 a curved or rounded target comprising said surface movably mounted to present a varying segment of said surface to a focus area, wherein said surface is movable vertically; and
 an optical sensor comprising a single sensing component, said sensing component mounted facing said surface of said target at said focus area, said optical sensor operative to compare images of said surface at known time intervals, wherein the single sensing component of said optical sensor detects a change in position of said surface in multiple directions, and the response of said optical sensor is substantially invariant to said vertical motion of said surface.

45. The optical sensor assembly of claim 44, wherein said optical sensor is positioned perpendicular to and beneath said surface.

46. The optical sensor assembly of claim 44 further comprising a switch disposed beneath a portion of said surface, wherein said vertical movement of said surface activates said switch.

47. A mouse replacement device comprising:
 an optical sensor assembly for tracking movement of a surface comprising:
  a curved or rounded target comprising said surface movably mounted to present a varying segment of said surface to a focus area, and
  an optical sensor comprising a single sensing component, said sensing component mounted facing said surface of said target at said focus area, said optical sensor operative to compare images of said surface at known time intervals, wherein the single sensing component of said optical sensor detects a change in position of said surface in multiple directions; and
 a rollerbar having a left end and a mounting end, said target formed on said rollerbar, wherein said rollerbar is traversable a left travel distance and an activation distance, and said focus area is located at approximately the sum to two times said left travel distance plus said activation distance from said left end of said rollerbar.

48. The mouse replacement device of claim 47 wherein said rollerbar has a first portion having a shiny hard surface and a second portion having a textured surface, said sensing component focused on said second portion.

49. A cursor control device comprising:
 a base;
 a support mechanism supported on said base;
 a curved or rounded target comprising a surface movably mounted on said support mechanism to present a varying segment of said surface to a focus area; and
 an optical sensor comprising a single sensing component, said sensing component mounted facing said surface of said target at said focus area, said optical sensor operative to compare images of said surface at known time intervals, wherein the single sensing component of said optical sensor detects a change in position of said surface in multiple directions;
 wherein the surface comprises a sleeve rotatable via a bearing mechanism around the support mechanism and translatable along the support mechanism, rotation and translation of the sleeve being interpretable by the sensor.

50. A cursor control device comprising:
 a base;
 a support mechanism supported on said base; a curved or rounded target comprising a surface movably mounted on said support mechanism to present a varying segment of said surface to a focus area, wherein the surface has a matte texture; and
 an optical sensor comprising a single sensing component, said sensing component mounted facing said surface of said target at said focus area, said optical sensor operative to compare images of said surface at known time intervals, wherein the single sensing component of said optical sensor detects a change in position of said surface in multiple directions.

51. An optical sensor assembly for tracking movement of a surface comprising:
   a curved or rounded target comprising said surface movably mounted to present a varying segment of said surface to a focus area, wherein the surface of said target is cylindrical; and
   an optical sensor comprising a single sensing component, said sensing component mounted facing said surface of said target at said focus area, said optical sensor operative to compare images of said surface at known time intervals, wherein the single sensing component of said optical sensor detects a change in position of said surface in multiple directions.

52. The optical sensor assembly of claim 51, wherein the surface of said target is supported by a rolling mechanism.

53. The optical sensor assembly of claim 51, wherein said surface is translatably and rollably mounted to present the varying segment of said surface to the focus area.

54. The optical sensor assembly of claim 51, wherein the single sensing component is operative to sense translational motion and rolling motion of said surface.

55. The optical sensor assembly of claim 51, wherein said surface is translatably and rotatably mounted to present the varying segment of said surface to the focus area.

56. The optical sensor assembly of claim 51, wherein the single sensing component is operative to sense translational motion and rotational motion of said surface.

57. The optical sensor assembly of claim 51, wherein the optical sensor is operative to detect patterns in the surface, the patterns comprising the images to be compared.

58. An optical sensor assembly for tracking movement of a surface comprising:
   a curved or rounded target comprising said surface movably mounted to present a varying segment of said surface to a focus area, wherein the surface of said target comprises a rollerbar; and
   an optical sensor comprising a single sensing component, said sensing component mounted facing said surface of said target at said focus area, said optical sensor operative to compare images of said surface at known time intervals, wherein the single sensing component of said optical sensor detects a change in position of said surface in multiple directions.

59. An optical sensor assembly for tracking movement of a surface comprising:
   a curved or rounded target comprising said surface movably mounted to present a varying segment of said surface to a focus area; and
   an optical sensor comprising a single sensing component, said sensing component mounted facing said surface of said target at said focus area, said optical sensor operative to compare images of said surface at known time intervals, wherein the single sensing component of said optical sensor detects a change in position of said surface in multiple directions;
   wherein said surface is translatably and rollably mounted to present the varying segment of said surface to the focus area.

60. An optical sensor assembly for tracking movement of a surface comprising:
   a curved or rounded target comprising said surface movably mounted to present a varying segment of said surface to a focus area; and
   an optical sensor comprising a single sensing component:, said sensing component mounted facing said surface of said target at said focus area, said optical sensor operative to compare images of said surface at known time intervals, wherein the single sensing component of said optical sensor detects a change in position of said surface in multiple directions;
   wherein the single sensing component is operative to sense translational motion and rolling motion of said surface.

61. An optical sensor assembly for tracking movement of a surface comprising:
   a curved or rounded target comprising said surface movably mounted to present a varying segment of said surface to a focus area; and
   an optical sensor comprising a single sensing component, said sensing component mounted facing said surface of said target at said focus area, said optical sensor operative to compare images of said surface at known time intervals, wherein the single sensing component of said optical sensor detects a change in position of said surface in multiple directions;
   wherein said surface is translatably and rotatably mounted to present the varying segment of said surface to the focus area.

62. An optical sensor assembly for tracking movement of a surface comprising:
   a curved or rounded target comprising said surface movably mounted to present a varying segment of said surface to a focus area; and
   an optical sensor comprising a single sensing component, said sensing component mounted facing said surface of said target at said focus area, said optical sensor operative to compare images of said surface at known time intervals, wherein the single sensing component of said optical sensor detects a change in position of said surface in multiple directions;
   wherein the single sensing component is operative to sense translational motion and rotational motion of said surface.

63. A cursor control device comprising:
   a base;
   a support mechanism supported on said base;
   a curved or rounded target comprising a surface movably mounted on said support mechanism to present a varying segment of said surface to a focus area, wherein the surface of said target is cylindrical; and
   an optical sensor comprising a single sensing component, said sensing component mounted facing said surface of said target at said focus area, said optical sensor operative to compare images of said surface at known time intervals, wherein the single sensing component of said optical sensor detects a change in position of said surface in multiple directions.

64. The cursor control device of claim 63, wherein the surface is rollably supported by said support mechanism.

65. The cursor control device of claim 63, wherein the surface is rollably supported by a bearing mechanism on said support mechanism.

66. The cursor control device of claim 63, wherein the surface is translatably supported by said support mechanism.

67. The cursor control device of claim 63, wherein the surface is translatably supported by a bearing mechanism on said support mechanism.

68. A cursor control device comprising:
   a base;
   a support mechanism supported on said base;

a curved or rounded target comprising a surface movably mounted on said support mechanism to present a varying segment of said surface to a focus area; and an optical sensor comprising a single sensing component, said sensing component mounted facing said surface of said target at said focus area, said optical sensor operative to compare images of said surface at known time intervals, wherein the single sensing component of said optical sensor detects a change in position of said surface in multiple directions;

wherein said surface is translatably and rollably mounted to present the varying segment of said surface to the focus area.

69. A cursor control device comprising:

a base;

a support mechanism supported on said base;

a curved or rounded target comprising a surface movably mounted on said support mechanism to present a varying segment of said surface to a focus area; and an optical sensor comprising a single sensing component, said sensing component mounted facing said surface of said target at said focus area, said optical sensor operative to compare images of said surface at known time intervals, wherein the single sensing component of said optical sensor detects a change in position of said surface in multiple directions;

wherein the single sensing component is operative to sense translational motion and rolling motion of said surface.

70. A cursor control device comprising:

a base;

a support mechanism supported on said base;

a curved or rounded target comprising a surface movably mounted on said support mechanism to present a varying segment of said surface to a focus area; and an optical sensor comprising a single sensing component, said sensing component mounted facing said surface of said target at said focus area, said optical sensor operative to compare images of said surface at known time intervals, wherein the single sensing component of said optical sensor detects a change in position of said surface in multiple directions;

wherein said surface is translatably and rotationally mounted to present the varying segment of said surface to the focus area.

71. A cursor control device comprising:

a base;

a support mechanism supported on said base;

a curved or rounded target comprising a surface movably mounted on said support mechanism to present a varying segment of said surface to a focus area; and an optical sensor comprising a single sensing component, said sensing component mounted facing said surface of said target at said focus area, said optical sensor operative to compare images of said surface at known time intervals, wherein the single sensing component of said optical sensor detects a change in position of said surface in multiple directions;

wherein the single sensing component is operative to sense translational and rotational motion of said surface.

72. A cursor control device comprising:

a base;

a support mechanism supported on said base, wherein the support mechanism comprises a member extending from a first end to a second end, the member cantilevered from a mount at the first end;

a curved or rounded target comprising a surface movably mounted on said support mechanism to present a varying segment of said surface to a focus area; and an optical sensor comprising a single sensing component, said sensing component mounted facing said surface of said target at said focus area, said optical sensor operative to compare images of said surface at known time intervals, wherein the single sensing component of said optical sensor detects a change in position of said surface in multiple directions.

73. The cursor control device of claim 72, wherein the first end of the member extends from the mount at an upward angle to form a bow in the member between the first end and the second end.

74. The cursor control device of claim 72, wherein the second end floats on a switch in a rest position.

75. A cursor control device comprising:

a base;

a support mechanism supported on said base, wherein the support mechanism comprises a member having a bowed shaped from a first end to a second end;

a curved or rounded target comprising a surface movably mounted on said support mechanism to present a varying segment of said surface to a focus area; and an optical sensor comprising a single sensing component, said sensing component mounted facing said surface of said target at said focus area, said optical sensor operative to compare images of said surface at known time intervals, wherein the single sensing component of said optical sensor detects a change in position of said surface in multiple directions.

76. A cursor control device comprising:

a base;

a support mechanism supported on said base, wherein the support mechanism comprises a springy member having a bowed shaped from a first end to a second end;

a curved or rounded target comprising a surface movably mounted on said support mechanism to present a varying segment of said surface to a focus area; and an optical sensor comprising a single sensing component, said sensing component mounted facing said surface of said target at said focus area, said optical sensor operative to compare images of said surface at known time intervals, wherein the single sensing component of said optical sensor detects a change in position of said surface in multiple directions.

77. The cursor control device of claim 76, further comprising a tension adjustment device disposed to adjust the bowed shape of the springy member.

78. The cursor control device of claim 77, wherein the tension adjustment device is disposed to adjust the angle of the springy member from horizontal at the first end.

* * * * *